United States Patent [19]
Bosworth

[11] Patent Number: 5,806,672
[45] Date of Patent: Sep. 15, 1998

[54] BOOKLET-TYPE CASE FOR COMPACT DISK RECORD

[76] Inventor: John Bosworth, 601 N. Broadway, Upper Nyack, N.Y. 10960

[21] Appl. No.: 732,975

[22] Filed: Oct. 16, 1996

[51] Int. Cl.$^6$ .................................................. B65D 85/57
[52] U.S. Cl. ........................ 206/310; 206/308.1; 206/312
[58] Field of Search ................................ 206/308.1, 309, 206/310, 312, 472, 493

[56] References Cited

U.S. PATENT DOCUMENTS

| | | | |
|---|---|---|---|
| 4,327,831 | 5/1982 | Inaba et al. | 206/310 |
| 4,895,252 | 1/1990 | Nomula et al. | 206/308.1 |
| 5,188,229 | 2/1993 | Bernstein | 206/312 |
| 5,284,242 | 2/1994 | Roth et al. | 206/310 |
| 5,402,882 | 4/1995 | Bandy et al. | 206/310 |
| 5,450,953 | 9/1995 | Reisman | 206/310 |
| 5,651,458 | 7/1997 | Brosmith et al. | 206/308.1 |
| 5,657,867 | 8/1997 | Fu et al. | 206/308.1 |

FOREIGN PATENT DOCUMENTS 2243145  10/1991   United Kingdom .................. 206/310

*Primary Examiner*—David T. Fidei
*Attorney, Agent, or Firm*—H. Gibner Lehmann; K. Gibner Lehmann

[57] ABSTRACT

A booklet for enclosing a compact disk record, includes a pair of stiff front and back cover members and a hinge connecting the members to each other for relative opening and closing movement. Carried at the interior surfaces of the cover members is a two-part separable snap fastener, one part of which is disposed at a hub on one member, the hub being frictionally received in the center hole of the compact disk record. The snap fastener releasably holds the cover members closed, as during storage and shipping, with the compact disk record sandwiched between the cover members. The snap fastener yields upon application of a small separating force to the cover members, to open the booklet and expose the compact disk record. The booklets are especially economical to produce, utilizing for the most part, readily available cardboard stock, and simple molded plastic parts.

43 Claims, 10 Drawing Sheets

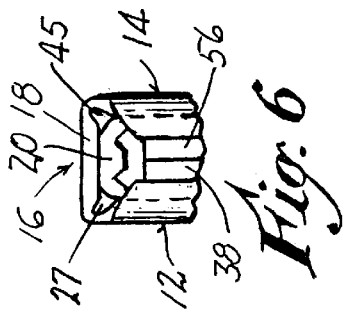
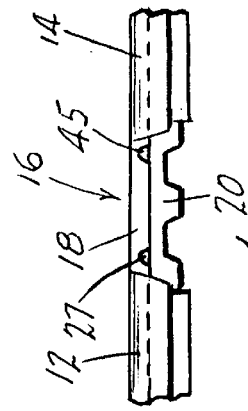
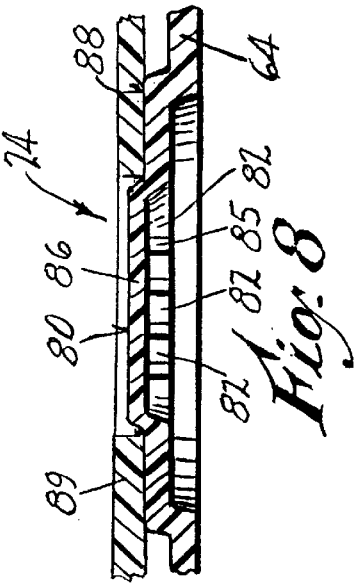
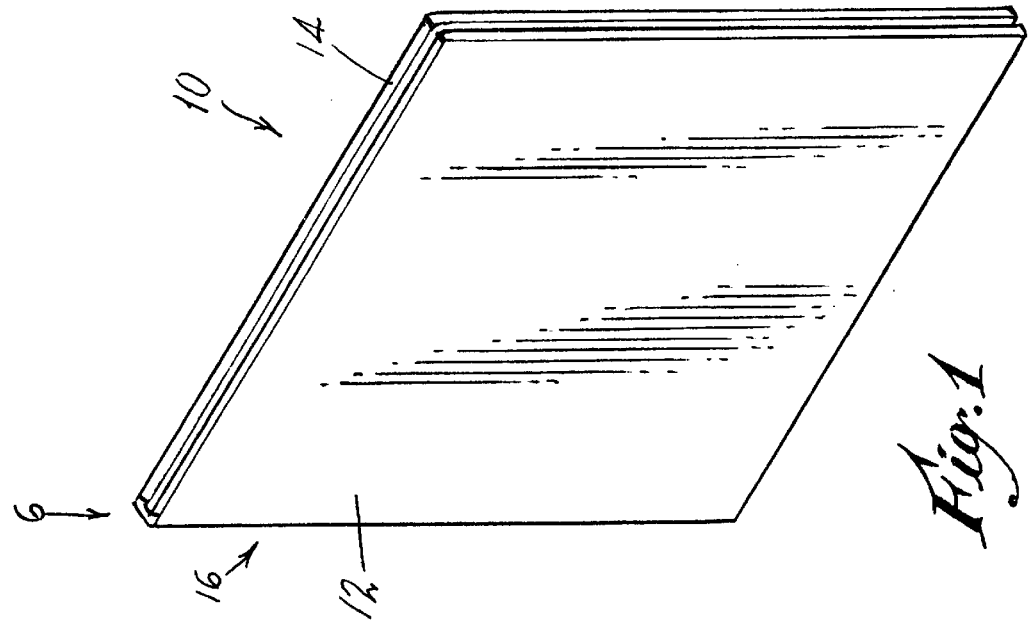

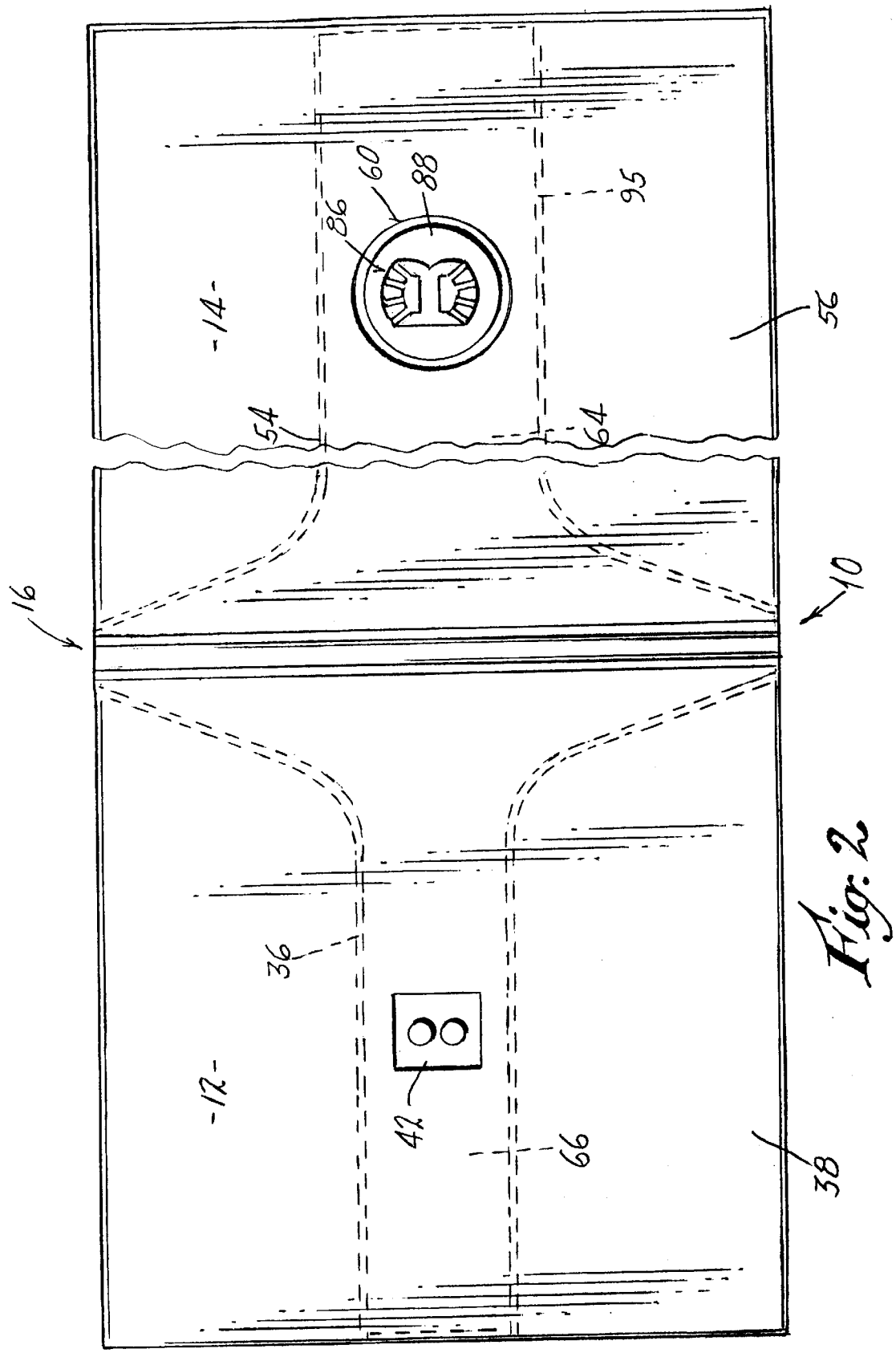

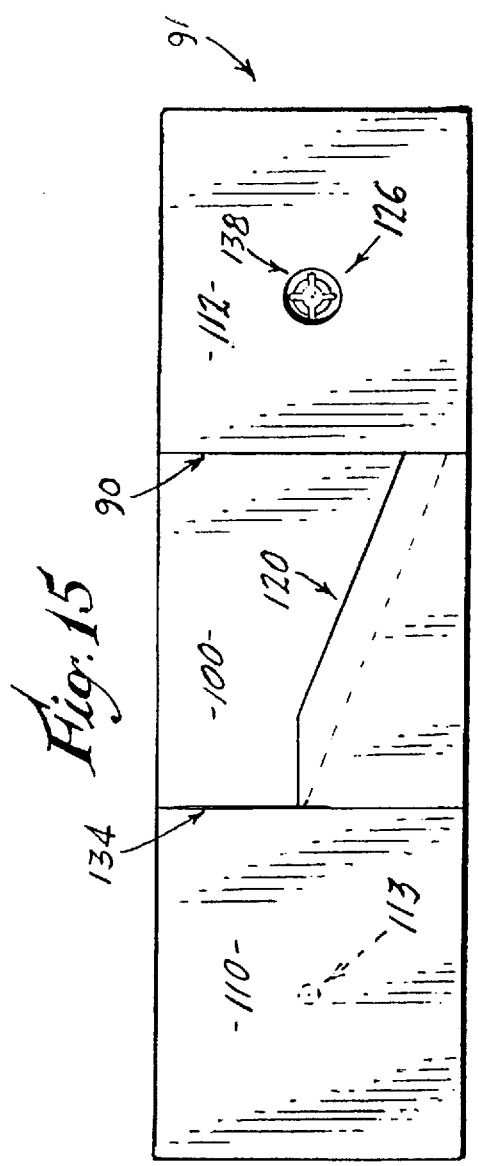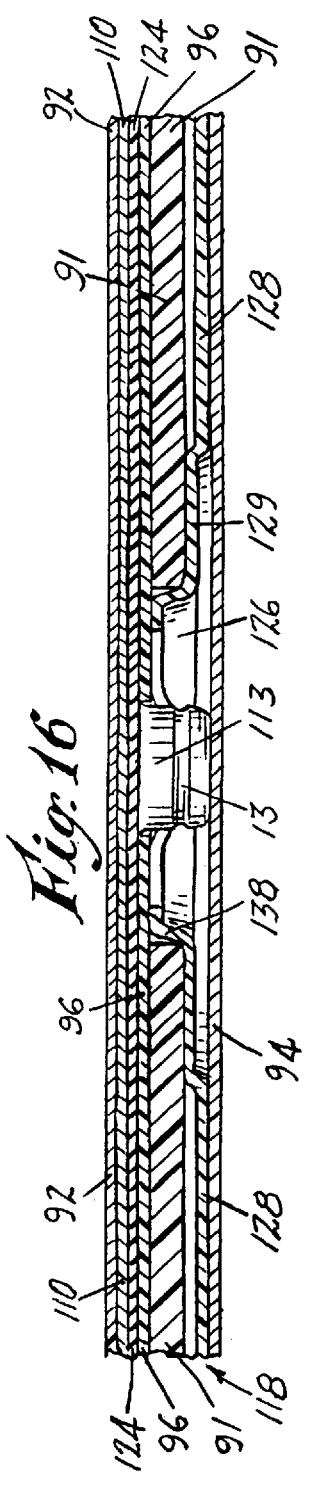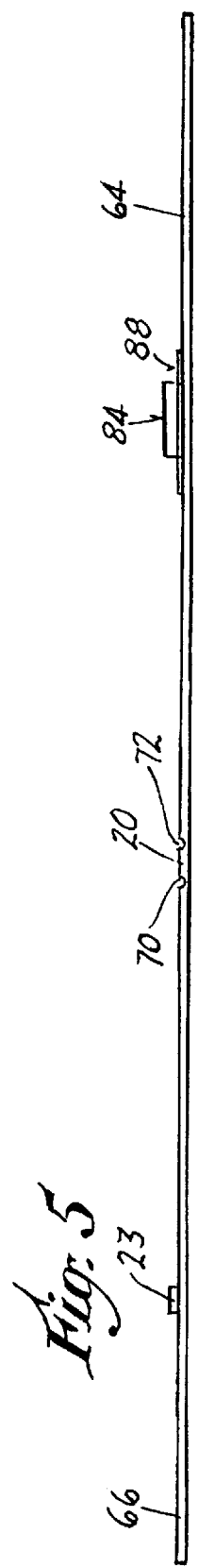

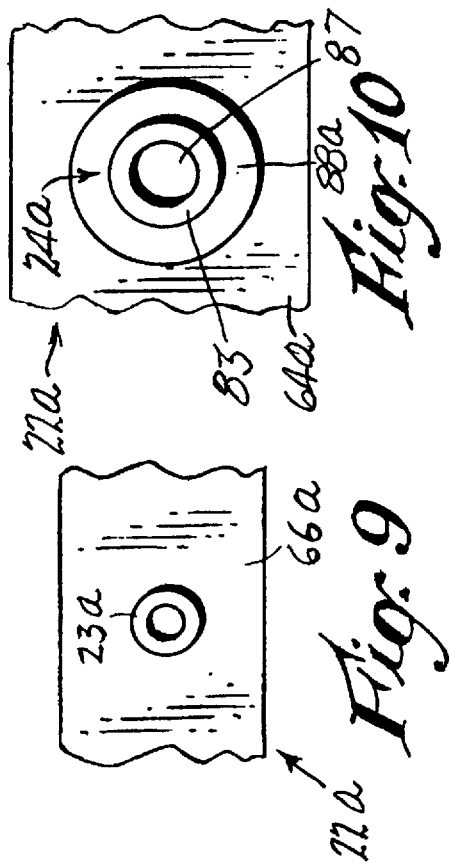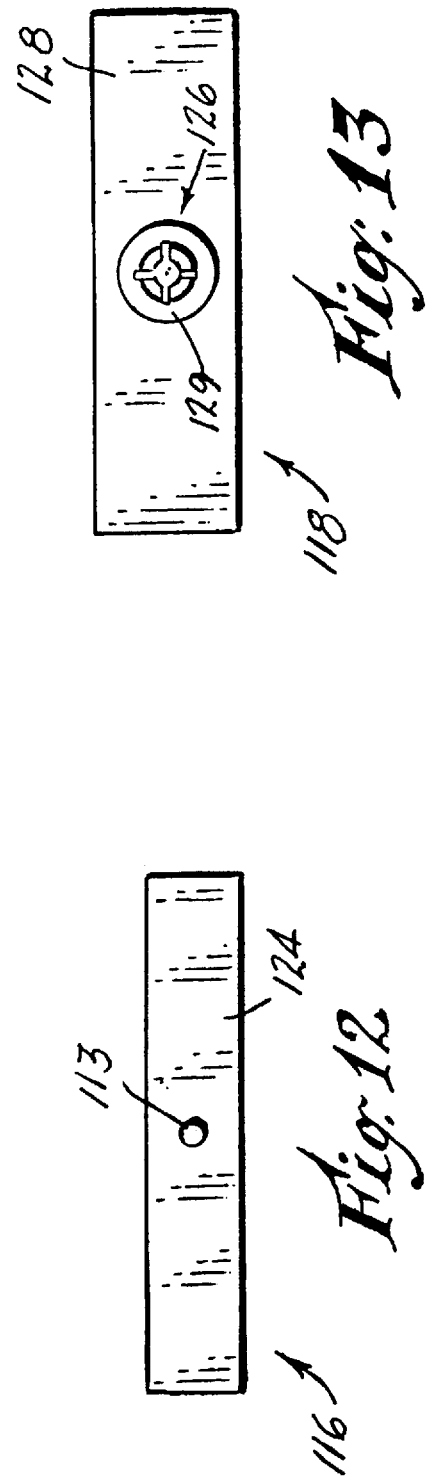

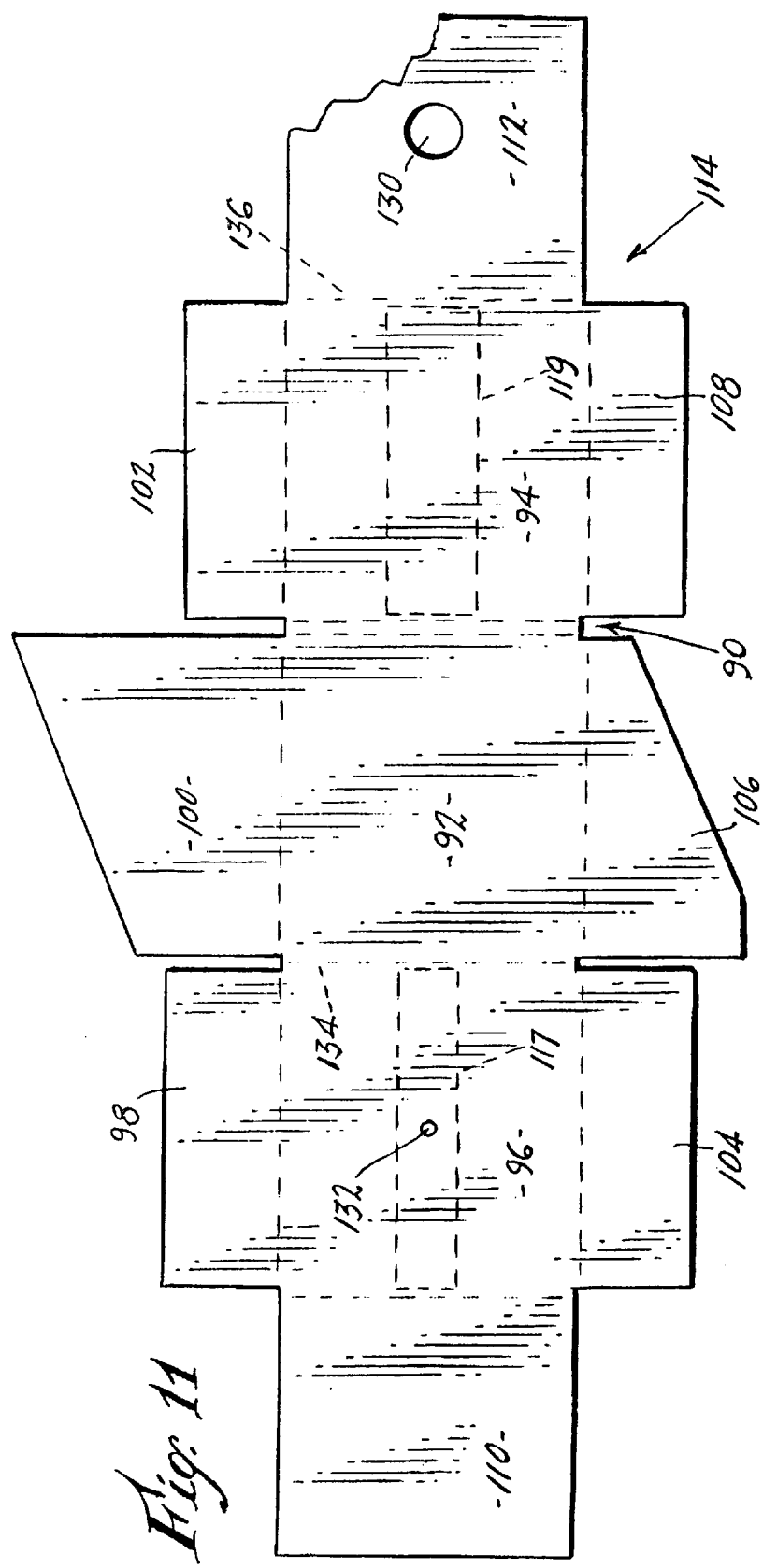

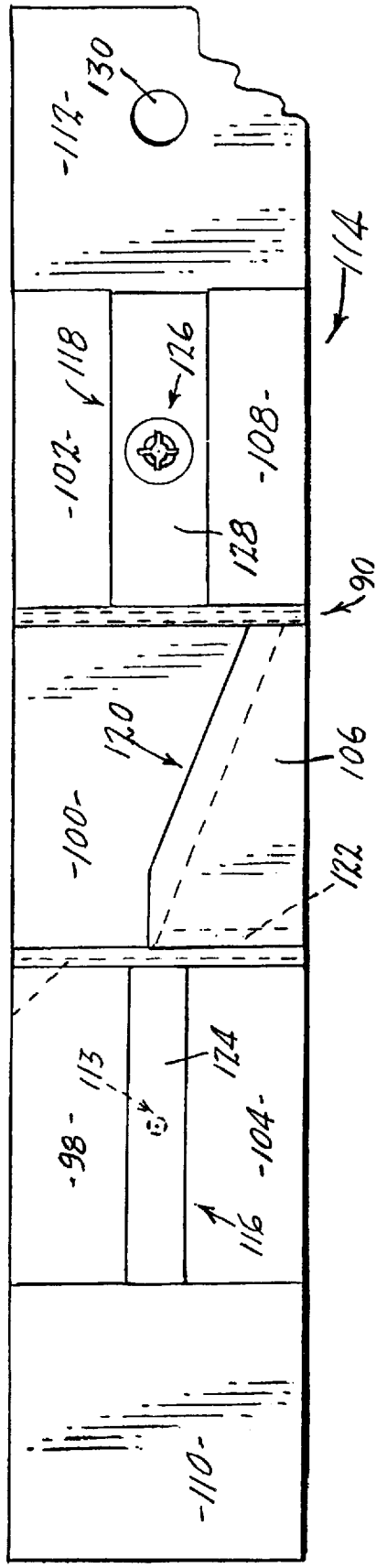

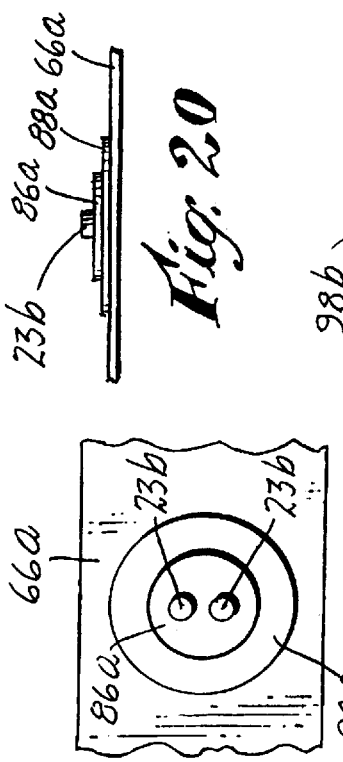
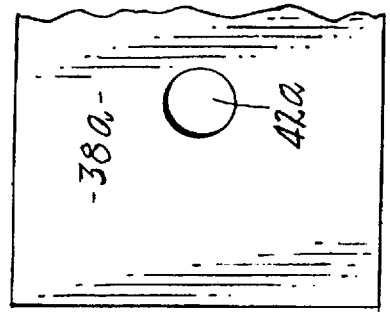
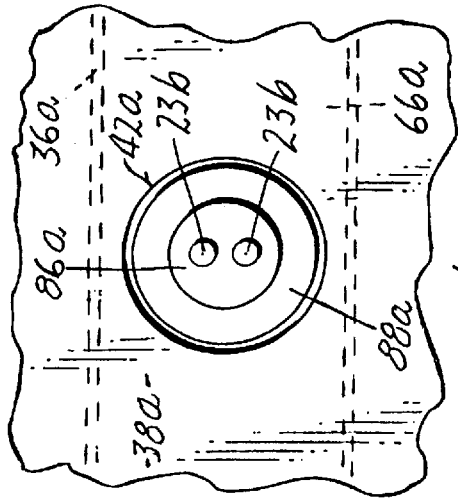
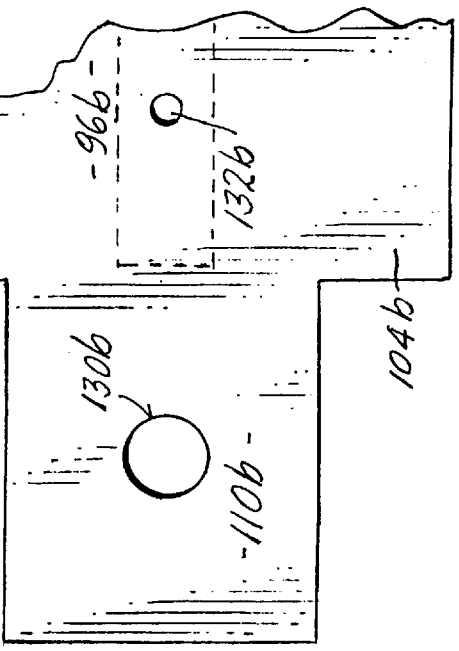
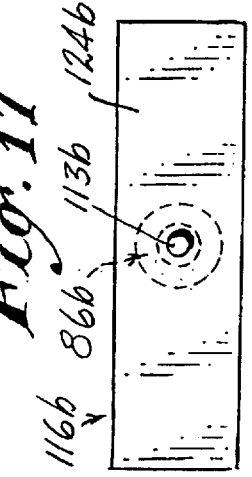

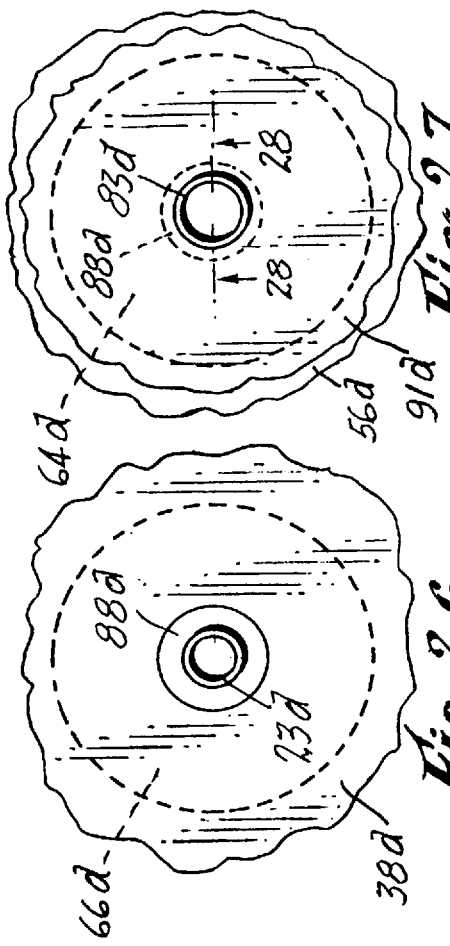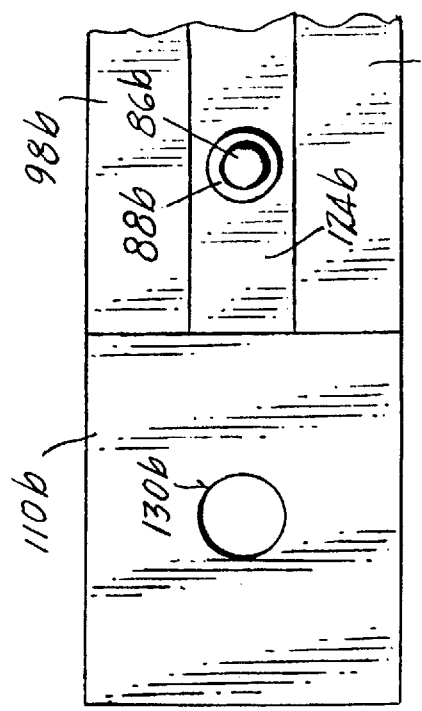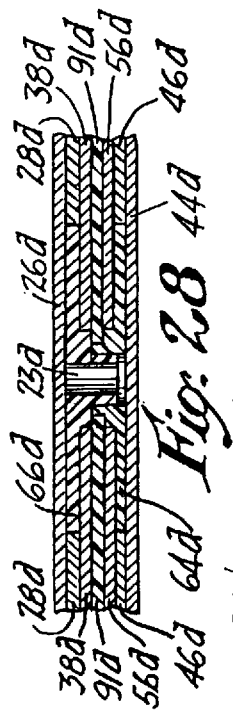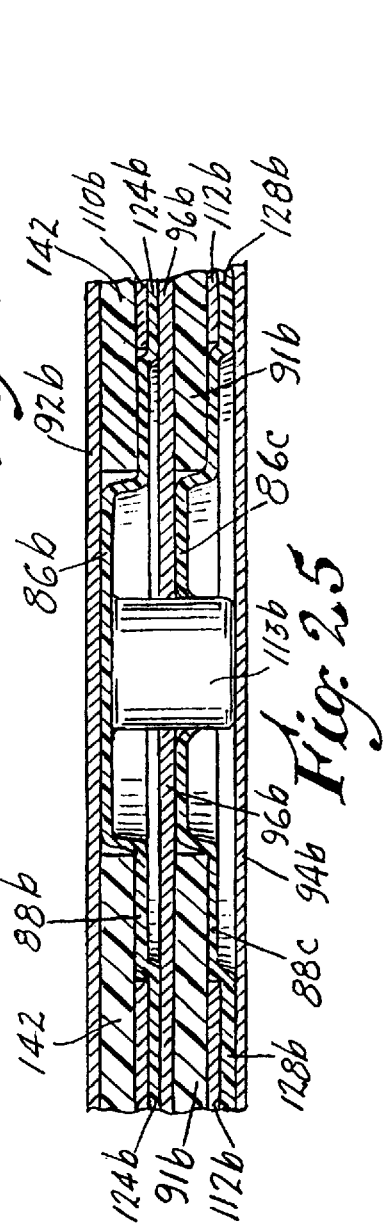

BOOKLET-TYPE CASE FOR COMPACT DISK RECORD

CROSS REFERENCES TO RELATED APPLICATIONS/PATENTS

1. My U.S. Pat. No. 5,511,659, granted Apr. 30, 1996, entitled COMPACT DISK RECORD PACKAGE WITH SLIDING COVER MEMBERS. The entire disclosure of U.S. Pat. No. 5,511,659 is hereby specifically incorporated by reference, into the present application.

2. My copending PCT International Published Application No. PCT/US95/14537, filed Nov. 8, 1995, entitled COMPACT DISK RECORD CASE. The entire disclosure of PCT International Published Application No. PCT/US95/14537 is hereby specifically incorporated by reference, into the present application.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates generally to compact disk records, and more particularly to cases or packages therefor which are characterized by economy in manufacture, ruggedness, and ease of use.

2. Description of the Related Art Including Information Disclosed Under 37 CFR §§1.97–1.99

Particular reference is made to U.S. Pat. No. 5,511,659, column 1, lines 21–63 thereof, which contains a brief discussion of some prior, known CD cases.

The following additional references were made of record in the processing of U.S. application Ser. No. 08/344,483, which matured into U.S. Pat. No. 5,511,659 above identified: U.S. Pat. Nos. 2,640,668; 4,899,875; 5,265,721; and 5,383,553.

The following references were cited in the International Search Report which accompanied the publication of PCT International Application No. PCT/US95/14537 above identified: U.S. Pat. Nos. 2,640,668; 4,899,875; 5,265,721; and 5,383,553. Also, Swiss Patent No. 138380.

The following references were made of record in the processing of U.S. application Ser. No. 08/532,478 identified above: U.S. Reissue Pat. No. 33,695. Also, U.S. Pat. Nos. 2,640,668; 4,463,849; 4,609,105; 4,702,369; 4,899,875; 5,011,010; 5,168,991; 5,263,580; 5,265,721; 5,383,553; 5,427,236; and 5,531,321. Also, European Published Application No. 546 736 A2; Swiss Patent No. 138380; British Patent No. 488,806; and Italian Patent No. 566,033.

U.S. Pat. No. 4,899,875 illustrates several examples of CD cases, mostly involving carrier trays of one form or another and which are adapted to be insertable in an outer housing, in the manner of a drawer. A total of 4 embodiments is disclosed. One relates to a rigid tray that has a semicircular recess to receive the compact disk, and which can be slidably inserted into the open end of the outer, slab-like housing. Other embodiments relate to various types of foldable tray constructions, all of which appear to be of relatively complex configuration.

U.S. Pat. No. 4,702,369 discloses a CD case employing two cover members which are hingedly connected, and a slide tray carrier member which has a recess to receive the CD. Each cover member has a cutout, and the cutouts register with one another when the cover members are closed. The arrangement is such that the carrier member and superposed CD can be slidably inserted between the cover members even when the latter are in a closed position, overlying one another.

U.S. Pat. No. 5,168,991 relates to a CD package comprising two hinged cover members which carry a tray having a central recess to receive the disk. When the cover members are open and disposed side by side in a common plane, the tray can be manually shifted to a first position which in effect straddles the hinge, for display purposes. For storage, the tray can be shifted so as to overlie one cover member, and the second cover member swung about the hinge, to as to close the package.

U.S. Pat. No. 5,427,236 involves a disk package having a tray-like carrier and a surrounding protective sleeve. In use, the consumer removes and discards the sleeve, but retains the carrier for subsequent storage of the disk. The carrier features a cover panel which has a disk-engaging projection that depresses one side of the disk when the panel is opened, so as to raise the opposite side of the disk and facilitate its removal from the carrier.

U.S. Pat. No. 5,531,321 discloses a CD package having a base, a hinged closure, and a floating holder that is carried by the base. The holder is movable on the base within limits, to accommodate a sandwiched compact disk and booklet associated therewith. There are provided on the base, spring fingers which bias the holder in a direction away from the base, so as to take up any looseness between the booklet and the cover when the latter is closed. Both thick and thin booklets can be accommodated in the package. In the latter instance the pressure of the cover on the thicker booklet causes the holder to be retracted against the relatively light spring biasing force of the spring fingers.

Published European Application No. EP 546 736 A2 discloses multiple embodiments of a captive-disk construction. In the first embodiment, there are provided two slide casings each of which has a cavity to receive complementary portions respectively of a disk. The casings are relatively moveable toward and away from one another within limits, so as to selectively either expose or conceal the captive disk. Guide bars on one of the casings extend into the other casing, to enable the casings to advance toward or retract away from one another. A spring normally biases the casings to a closed position wherein their cavities adjoin. Under such circumstances, the abutting edge portions of the casings which border the cavities, close off the latter so as to avoid contamination of the disk when it is not in use. The construction is intended for use with automatic cartridge-type disk loading systems utilizing electronic read/write recording heads.

In many of the prior case constructions utilizing conventional plastic hinges, there was a tendency for the cases to break, especially if they experienced rough handling by the consumer, often the result of his haste or impatience, or a lack of understanding of the particular structures involved.

For example, the arrangement illustrated in U.S. Pat. No. 5,265,721 is considered susceptible to inadvertent breakage, particularly if care is not exercised in dealing with the hinges. The same is believed to be true in connection with the device shown in U.S. Pat. No. 5,383,553.

The potential problems noted above in connection with hinged structures has, for a large part, rendered many prior cases unworkable. In spite of this, the jewel cases currently on the market are of a hinged-type almost exclusively, and have surprisingly enjoyed a considerable degree of commercialization.

In some prior constructions, there also existed the possibility of inadvertent scratching of the CD record surface, often causing permanent damage to the data/recorded material contained thereon.

Finally, with just about all existing cases the consumer has experienced difficulty in use; the cases are fragile, and often difficult to open and close. The provision of multiple detents for hinged cases, coupled with a requirement to insert one's fingernail and pry open a case, are at best, a compromise solution to the problem of convenient, inexpensive display and storage of compact disk records.

SUMMARY OF THE INVENTION

The above disadvantages and drawbacks of prior cases for compact disk records are largely obviated by the present invention, which has for one object the provision of a novel and improved folder booklet for enclosing a compact disk record, which is simple in its structure, and extremely inexpensive to manufacture and assemble.

Still another object of the invention is to provide an improved booklet for a compact disk record as above set forth, which lends itself to assembly by automated equipment, thereby reducing the overall cost and rendering the device economical from the commercial standpoint.

Yet another object of the invention is to provide an improved booklet for a compact disk record in accordance with the foregoing, which is especially rugged and reliable in use, and which is highly resistant to inadvertent damage or breakage, in both shipping and handling, and in use by the consumer.

A further object of the invention is to provide an improved booklet for a compact disk record as above characterized, which is aesthetically pleasing in its overall appearance, thereby enhancing its attractiveness and eye-appeal, so as to contribute to the overall marketability of the device.

A still further object of the invention is to provide an improved booklet for a compact disk record as outlined above, which readily lends itself to the addition of suitable ornamentation and text material, so as to further enhance the overall aesthetic impression given to the prospective consumer.

Yet another object of the invention is to provide an improved booklet in accordance with the foregoing, for accommodating a plurality of compact disk records in side-by-side relation, while maintaining simplicity of construction, economy of manufacture and ready accessibility to the records, by the consumer.

The above objects are accomplished by a protective folder or booklet for a compact disk record, comprising in combination a back cover or base member having an expansive surface adapted to underlie the compact disk record, a front or cover member, and means hingedly connecting the cover member to the base member so as to form a booklet. The cover member has an expansive surface adapted to overlie the compact disk record when the latter is disposed in overlying relation to the base member. Means are provided on one of the members, providing a projection which extends through the center hole in the compact disk record when the latter is disposed between the members. In addition, cooperable fastener means are provided on the members, having a receptacle or fastener portion oriented at the location of the projection, for releasably maintaining the members in overlying relation with one another and with the compact disk record sandwiched therebetween. The hinged connecting means preferably includes a living hinge member having oppositely-extending tongues, one tongue being connected with the base member and the other tongue being connected with the cover member. The arrangement is such that the base member and cover member, when opened, can flex with respect to each other about the axis of the living hinge.

The objects are further accomplished by several different booklet configurations for variously enclosing compact disk records, each configuration essentially comprising in combination a pair of stiff front and back covers, hinge means connecting the covers to each other for relative opening and closing movement, and a two-part separable fastener, the parts of which are respectively carried at the interior surfaces of the covers and at locations spaced inwardly of the edges thereof. The two-part fastener is adapted to pass through the center holes of compact disk records and to releasably hold the records captive between the covers when the latter are closed.

With the disclosed constructions, a record, when stored, is completely covered on both of its opposite faces. The record is positioned on a hub on one of the covers. The booklet can be readily opened by merely separating any one of the three pairs of coextensive edges of the booklet, to thus expose the record and enable it to be readily grasped at its peripheral edge portion so as to not damage the recorded surface. Reinstallation of the record is similarly simplified, involving merely placing it on the hub of the one cover, and folding the other cover onto the first so as to form the closed booklet, and applying a slight pressing force to the exterior faces of the covers and at the location of the hub, so as to actuate the fastener parts, which thereafter maintain the covers in a closed position.

Other features and advantages will hereinafter appear.

BRIEF DESCRIPTION OF THE DRAWINGS

In the drawings, illustrating preferred embodiments of the invention:

FIG. 1 is a perspective view of the CD booklet of the invention, shown in its closed position.

FIG. 2 is a top plan view of the booklet of FIG. 1, shown in an open, essentially flat condition, and illustrating cooperable fastening means on the interior of the booklet.

FIG. 5 is a side edge elevation of the molded plastic hinge member of FIG. 4.

FIG. 6 is a fragmentary top edge view, greatly enlarged, of the living hinge portion of the booklet of the invention, in its closed position. This view is looking in the direction of the arrow "6" of FIG. 1.

FIG. 7 is a fragmentary top edge view, greatly enlarged, of a composite living hinge portion of the booklet of the invention, in its open position.

FIG. 8 is a fragmentary section, taken on the line 8—8 of FIG. 4.

FIG. 9 is a fragmentary plan view, of one tongue of a modified plastic hinge member, showing part of a simplified fastener portion, constituting another embodiment of the invention.

FIG. 10 is a fragmentary plan view, of the other tongue of the plastic hinge member of FIG. 9, showing another part of the simplified fastener of the hinge member of FIG. 9.

FIG. 11 relates to another embodiment of the invention. It consists of a plan view, in reduced size, of a cardboard blank which is utilized to form a multiple-leaf booklet for packaging a CD record.

FIG. 12 is a plan view, somewhat less reduced, of a front fastener part for use with the blank of FIG. 11.

FIG. 13 is a plan view, also somewhat less reduced, of a back fastener part for use with the blank of FIG. 11.

FIG. 14 is a plan view of the blank of FIG. 11, showing side panels thereof after being infolded, and showing the fastener parts of FIGS. 12 and 13 put in place.

FIG. 15 is a plan view like that of FIG. 14 but showing fastener-locking end panels of the blank after being folded in.

FIG. 16 is a sectional view, greatly enlarged, of the fastener parts of the booklet and associated cardboard components.

FIG. 17 is a fragmentary plan view of the inside panel of the front cover of a CD booklet package adapted to hold two CD records, constituting another embodiment of the invention.

FIG. 18 is a fragmentary plan view on a reduced scale of the inside of the front end panel of the cardboard blank from which the front cover of FIG. 17 was made.

FIG. 19 is a fragmentary plan view of a fastener part as utilized in the front cover of FIG. 17.

FIG. 20 is an edge view of the portion of the fastener part shown in FIG. 19.

FIG. 21 is a fragmentary plan view on a reduced scale of a portion of a cardboard blank according to still another embodiment of the invention, which is adapted to hold two CD records and also a descriptive brochure relating to the records.

FIG. 22 is a plan view on a reduced scale of a combined front fastener part and record mounting, for use with the cardboard blank of FIG. 21.

FIG. 23 is a fragmentary plan view on a reduced scale, of the partially-assembled blank of FIG. 21 and the fastener part of FIG. 22.

FIG. 24 is a fragmentary plan view of the booklet portion shown in FIG. 23, with the front end panel folded in place.

FIG. 25 is a fragmentary sectional view, greatly enlarged, of the fastener and record disk mounting parts as related in their operative positions when the booklet of this later embodiment is folded closed.

FIG. 26 is a fragmentary plan view of the inside of the front cover of a CD record booklet illustrating another embodiment of the invention, having unique fastener parts.

FIG. 27 is a fragmentary plan view of the inside of the back cover, of the embodiment of FIG. 26 holding a CD record, and FIG. 28 is fragmentary sectional view of the fastener parts of the embodiment of FIGS. 26 and 27 in assembled mode with a CD record sandwiched in between. The section is taken on the line 28—28 of FIG. 27.

DESCRIPTION OF THE PREFERRED EMBODIMENTS

Figure 3:
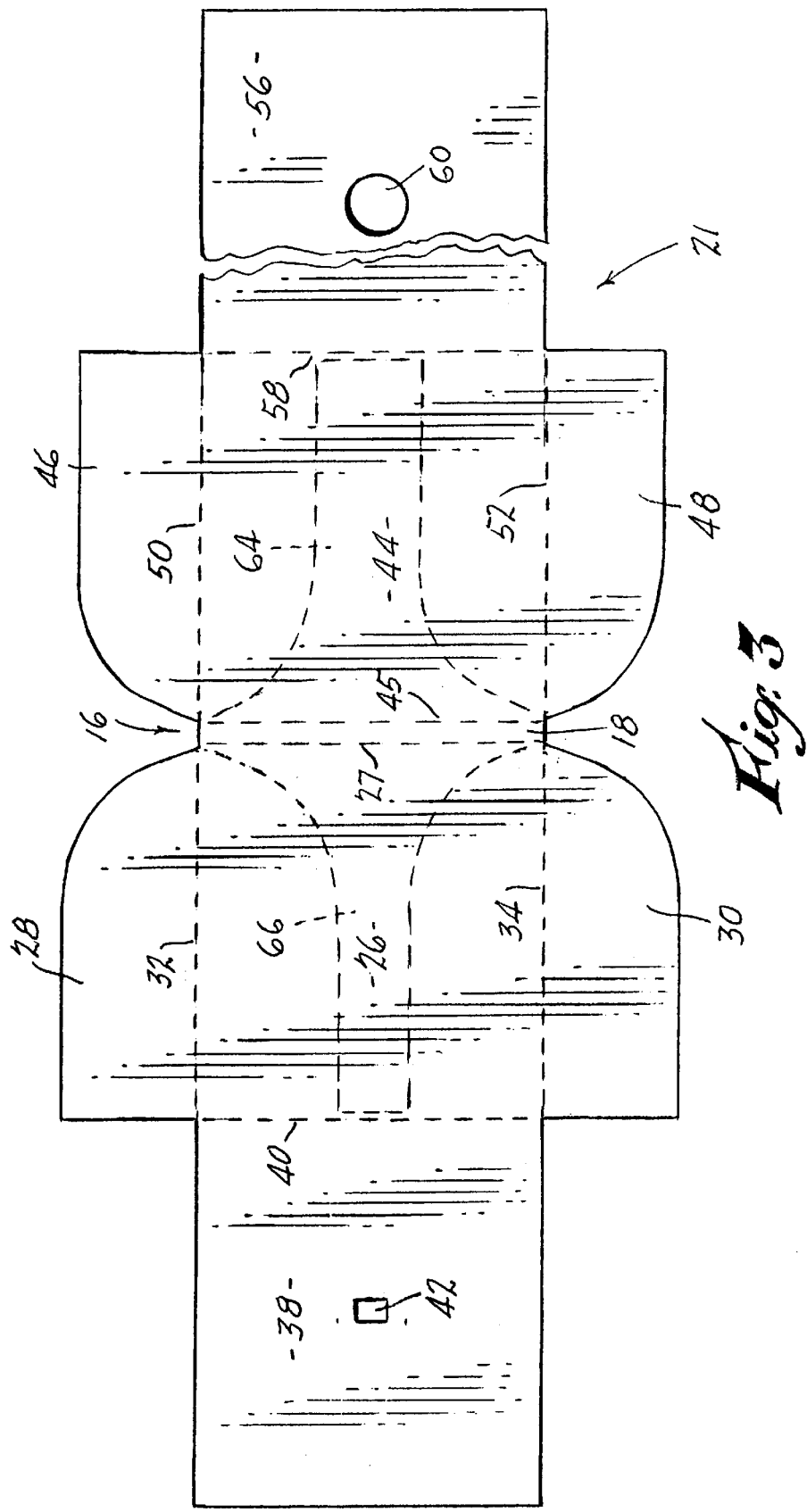
FIG. 3 is a top plan view of a cardboard blank used to form a portion of the booklet of FIGS. 1 and 2.

Essentially the present invention provides as a new article of manufacture, an improved folder or booklet for storing compact disk records, in part constituted essentially of cardboard which can be coated on one or both sides so as to provide a shiny surface finish, and in part, of plastic fastener and reinforcement means enclosed by the cardboard, both of said parts providing a durable small booklet that constitutes a commercially useful package for the CD record. At the same time, in a preferred embodiment, the plastic means constitutes a rugged and workable hinge member which additionally provides a stiffening and strengthening characteristic to the booklet, resulting in increased ruggedness as compared to constructions constituted solely of either plastic or cardboard, or of a composite cardboard/paper material.

FIGS. 1, 2, 6 and 7 show the improved booklet or folder of the present invention, generally designated by the numeral 10, comprising rectangular front and back covers 12 and 14, having expansive surfaces which are adapted to enclose or sandwich a CD record, and composite hinge means 16 in the form of a cardboard hinge portion 18 and a plastic living hinge portion 20, such means comprising a sturdy compound living hinge to be described below.

In a preferred form, according to the invention, the entire booklet 10 of the invention is constituted of only two separate pieces, one piece being a blank 21 which is cut from a sheet of cardboard, and which is particularly shown in FIG. 3, and the other being a resilient or flexible plastic hinge and fastener member or support strip 22 constituted of suitable tough material such as polypropylene, over which various panels of the cardboard blank 21 are folded so as to retain the plastic hinge member 22 captive in an operative position in the booklet.

Figure 4:
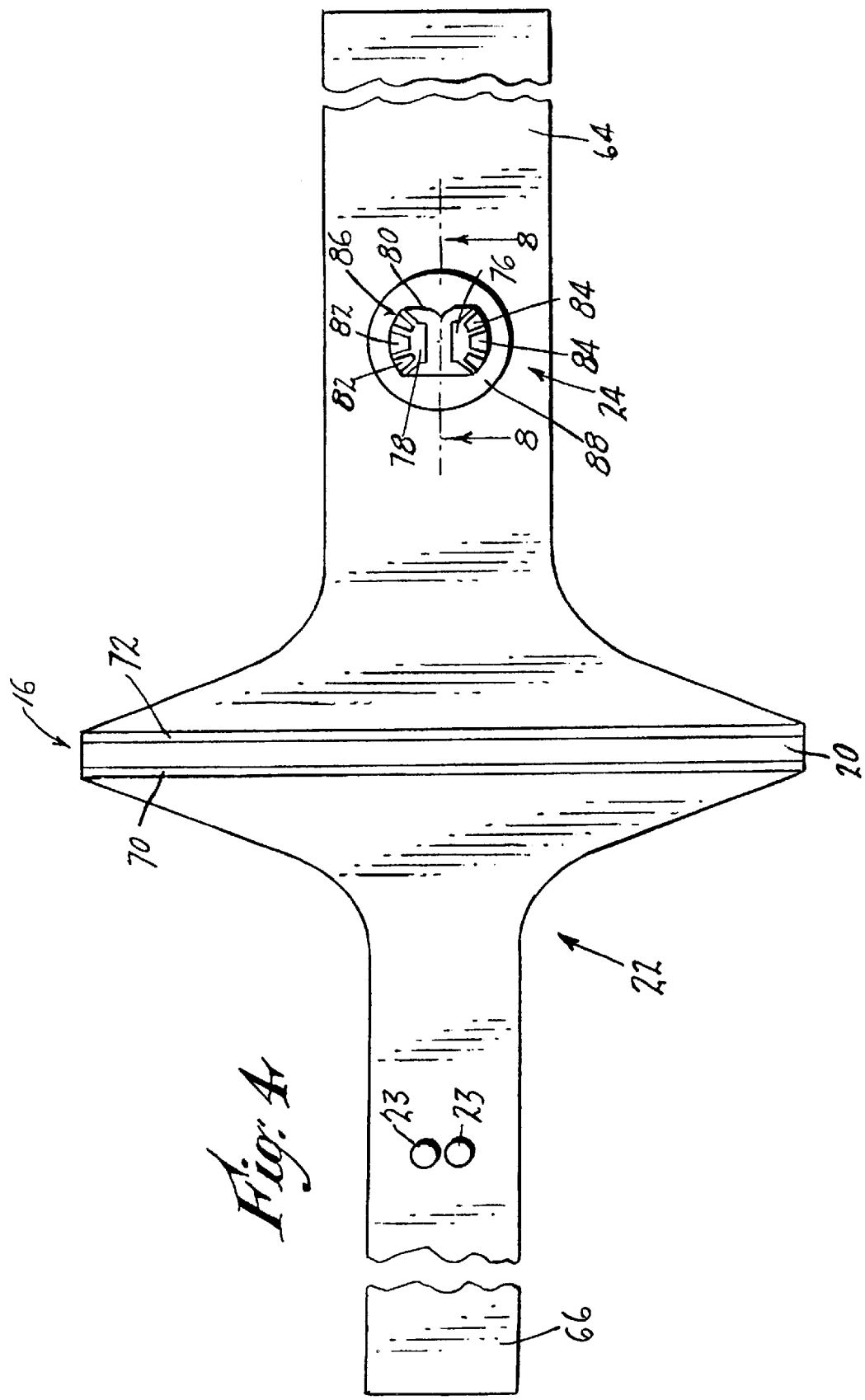
FIG. 4 is a top plan view of a molded plastic hinge member used to form another portion of the booklet of FIGS. 1 and 2.

Also, referring particularly to FIGS. 4 and 5, by the invention, there is formed on the plastic hinge member 22 at the time of molding, a two-part separable fastener structure comprising one or two projecting pins 23, and a socket formation 24 adapted to receive the projecting pins 23 at the time the booklet 10 is closed, as in FIG. 1.

Referring now to FIG. 3, the cardboard blank 21 has a front face cover panel 26 constituted as a facing which in part forms one cover of the booklet 10, and a back face cover panel 44 connected to the front cover panel by the hinge portion 18 defined by fold lines 27 and 45. The blank 21 has foldable side panels labelled 28 and 30, respectively, which are adapted to be folded inwardly along respective fold lines 32 and 34, so as to form a flat or shallow T-shaped recess 36 (shown in broken outline in FIG. 2), to receive one portion or tongue of the plastic hinge and fastener member 22 to be described below. Also, an end panel 38 (FIG. 3) is provided, which is integral with the face panel 26 and foldable thereover along a fold line 40 to a position wherein it overlies the folded-in side panels 28 and 30. The T-shaped space configuration between the near inner edges of the panels 28 and 30 forms the flat recess or pocket 36 in which one tongue 66 of the plastic hinge member 22 is received. A clearance hole 42 in the end panel 38 is provided, the purpose of which will be described below.

The rear or back cover 14 similarly comprises the face cover panel 44 which in part forms the other leaf 14 of the booklet 10; it has two foldable side infold panels 46 and 48 respectively, which are adapted to be folded inwardly along respective fold lines 50 and 52, so as to form a T-shaped recess 54 (FIG. 2) which receives the other portion or tongue 64 of the plastic hinge member 22 to be described below. The blank 21 has an end infold panel 56 (FIG. 3) which is integral with the panel 44 and inwardly foldable along a fold line 58 to a position wherein it overlies the folded side panels 46 and 48. In addition, a clearance hole 60 in the end panel 56 is provided, for a purpose to be described.

The folding of the blank 21 at the fold lines 32, 34, 40; and 50, 52, 58 results in a smoothly rounded edge configuration, at the peripheries of the front and back face covers 12, 14, namely at the top edges, the right side edges, and the bottom edges of the booklet 10 shown in FIG. 1.

Referring now to FIGS. 4 and 5, the plastic hinge member 22 comprises an essentially flat strip in the form of the oppositely-extending tongues 64 and 66 which are joined by the living hinge portion 20. The latter comprises two spaced-apart transverse grooves or hinges 70, 72 which extend substantially the full length of the hinge portion or member 22. The strip making up the hinge member has two reinforcing portions, one of the portions being disposed on one side of the hinge portion 20 and the other being disposed on the opposite side of the hinge portion 20. The tongue 64 has the socket formation 24, which comprises means defining a pair of crescent-shaped through openings 76, 78 bordered by higher land portions 80, 82 and 84 which are seven in number, as well as eight slits 85 (FIG. 8) which are in communication with the through openings 76, 78. The lands 80, 82 and 84 together define a hub 86 having a semi-cylindrical outline or periphery which is adapted to be received in and frictionally grip the edge of the central hole of a CD record which is to be stored and carried in the booklet. A plateau or land 88 is preferably provided, to space the disk, which latter is shown in fragmentary section in FIG. 8 and labelled 89. The land 88 extends slightly above the surface of the panel 56 as viewed in FIG. 2.

The spacing between the mounting hub 86 and hinge 20 is at least equal to the radius of the compact disk record 89, such that when the strip 22 is folded or collapsed, as during closing of the booklet, the pins 23 align with the socket openings 76, 78, respectively and are thereafter easily insertable therein, preferably with an accompanying "snap" sound and feel, to apprise the user that the booklet is closed. The collapsed strip 22 thus links the compact disk record along a radius, in the manner of a yoke.

The oppositely-extending tongue 66 of the plastic hinge member 22 has, in the preferred form, the two side-by-side projecting pins 23, 23 which are receivable in the openings 76, 78 of the socket formation 24 described above, when the booklet of the invention is closed as in FIG. 1.

Referring to the figures, it can be understood that the back cover 14, with its side panels 46, 48 folded and glued to the panel 44, forms the T-configuration recess 54 which is of the same general outline as that of the plastic tongue 64 (FIG. 4), but slightly larger, typically by 1/16 of an inch or more, so as to provide a small clearance space 95 between the periphery of the tongue 64 and the wall of the recess 54, this permitting limited shifting movement of the tongue 64 on the panel 44 (FIGS. 2 and 3). Also, the clearance hole 60 is larger than the land 88 on which the compact disk record 89 sits, so as to enable such shifting to occur.

Considering now the front cover member 12, with its end panel 38 and side panels 28, 30 folded in the manner of FIGS. 2 and 3, there is formed the flat, T-shaped recess or pocket 36 which is of the same general outline as that of the plastic tongue 66, but slightly larger, typically by 1/16 of an inch or more, so as to permit limited shifting movement of the tongue 66 with respect to the panel 26. Also, the clearance hole 42 is larger than the dimension represented by the two side-by-side projecting pins 23 so as to enable such shifting to occur.

Referring to FIG. 3, in fabrication of the booklet 10, starting with the cardboard blank 21, the side panels 28 and 30, as well as side panels 46 and 48, are preferably folded and then glued to the cardboard panels 26, 44 respectively, so as to form a double thickness of material. The plastic hinge member 22 is then placed in position onto the cardboard blank 21 with the latter in a flat condition, with one tongue 66 thereof being positioned in the recess 36 formed by the infolded side panels 28, 30, and with the other tongue 64 being positioned in the recess 54 formed by the infolded side panels 46, 48. Thereafter, each of the end panels 38 and 56 is folded inwardly, the panel 56 toward the left in FIG. 3, and the panel 38 toward the right in this figure, so as to almost completely overlie the plastic hinge member 22 as in FIG. 2. The end panels 38 and 56 are in turn, glued to the infolded and glued side panels 28, 30 and 46, 48, respectively, but not to the plastic hinge member 22. During the folding of the end panels 38 and 56, the holes 42 and 60 respectively clear the projecting pins 23, 23 and the hub 86.

Stated differently, the tongue 64 of the plastic hinge member 22 is retained or confined by the folded side panels 46, 48 and the panels 44, 56 of the one cover member 14 of the booklet, but can shift within limits, with respect to the respective cover member 14 so as to accommodate the relative movements that are necessary during opening and closing of the two cover members 12, 14. Similarly, the tongue 66 of the plastic hinge member 22 is retained or confined by the folded side panels 28, 30 and panels 26, 38 of the front cover member 12 of the booklet, and can shift within limits with respect to the front cover member 12 so as to accommodate the relative movements that are necessary during opening and closing of the two covers 12, 14. In effect, each plastic tongue fits into a recess formed by one set of side panels, face panel and end panel for the one tongue, and another set of side panels, face panel, and end panel for the other tongue.

The back cover member and front cover member are seen to be of equal width, and the length of the living hinge is roughly the same as the widths of these members.

Also, the sheet-like tongue portions 64, 66 are actually reinforcing means which stiffen the portions or laminations 26, 28, 30, 38; and 44, 46, 48 and 56 that make up the front and back cover members 12 and 14 respectively, of the booklet 10.

The need for slack between each tongue of the plastic hinge member 22 and respective cardboard panels 26, 44 arises from the fact that during folding, the required extension in actual length of the outer, cardboard material at the hinge thereof is greater than the corresponding extension in length of the plastic hinge 22 at the location of the living hinge 20. Were the plastic and cardboard parts held rigid, an undesirable stiffening of the entire booklet would likely result, possibly leading to stresses in the cardboard and/or plastic, and distortion of the parts.

As can be readily seen in FIG. 2, in the open position of the booklet the tongues 66, 64 are remote from one another, whereas when the booklet is closed as in FIG. 1, the tongues are collapsed so as to be adjacent to each other and to overlie one another, with the compact disk record sandwiched therebetween.

In the preferred embodiment, the socket formation 24 has the configuration of the capital letter "B", when viewed from above, with the voids in the "B" constituting the crescent shaped openings 76, 78 which telescopically receive the pins 23 when the booklet is closed.

The pins 23 may, in some circumstances, be provided with undercut formations at their ends, in order to render a "snap" type retention of the pins in their respective openings 76, 78. Other cooperable undercuts in the openings of the socket 24 may also be included, if desired, depending upon the degree of stiffness or rigidity of the particular plastic that is utilized, and the desired retentive force needed to maintain the booklet closed when not in use, while still not interfering with smooth release of the fastener when it is desired to open the booklet. FIG. 16, described later, shows such an undercut 13 in the pin 113.

Similarly, small undercuts on the exterior surface of the hub 86 may be included, so as attain the desired degree of retention of the CD record. This, again, depends upon tolerances of the hub and the record opening, and to a lesser extent upon the physical characteristics of the particular plastic that is utilized.

Another embodiment of the invention is shown in FIGS. 9 and 10, wherein a modified resilient plastic strip 22a is illustrated, having tongues 64a and 66a, respectively. By the invention, the tongues 64a and 66a are provided with a modified resilient snap fastener structure, comprising a circular post or ring 83 with a through hole or opening 87, and a hollow projecting pin or ring 23a which can be telescopically received in the ring 83 in the fastening mode of the fastener. Either or both of the rings 83, 23a can be resilient. The opening 87 constitutes a socket for the ring 23a, as in the previous embodiment. The surfaces of the ring 23a and opening 87 thus constitute parts of a two-part fastener, the parts of which frictionally engage each other at a plurality of locations about the periphery of the opening 87. The through hole 87 is disposed at the center of the ring 83 which is received in the center hole of the compact disk record. The ring 83 is intended to receive and frictionally bear against the edge of the center hole in the compact disk record.

It is considered that the modification of FIGS. 9 and 10, being somewhat simpler in configuration than that of the previously described embodiment, may be suitable for some applications.

Still another embodiment of the invention is illustrated in FIGS. 11–16. In this embodiment the booklet is of the type which has multiple leaves and also a pocket for holding descriptive material.

In the ensuing description, the following descriptive terms and respective reference characters are used: double line fold, 90; front cover face panel, 92; back cover face panel, 94; front fastener part carrier panel, 96; side panel for locating front fastener part, 98; side panel to stiffen front cover, 100; side panel for locating back fastener part, 102; side panel for locating front fastener part, 104; pocket flap side panel, 106; side panel for locating back fastener part, 108; end panel for locking front fastener part, 110; and end reinforcing panel for locking back fastener part, 112.

In FIGS. 11, 14 and 15, those components which are located to the left of the double line fold 90 are considered as constituting the "front cover" of the booklet, and those components which are located to the right of the double line fold 90 are considered as constituting the "back cover" of the booklet, where these terms and numbers are applied in the description and in the appended claims.

FIG. 11 shows the completed cardboard blank 114 as laid out and utilized by the invention, FIGS. 12 and 13 show respectively the plastic front and back fastener parts 116 and 118, FIG. 15 shows the cardboard blank 114 of FIG. 14 with its side panels 98, 102, 104 and 108 folded inward and glued, and with the fastener parts 116 and 118 in place on the blank and a pocket 120 already formed. The pocket panel 106 is glued along a glue line 122, FIG. 14.

The intended locations of the front and back fastener parts 116 and 118 are indicated respectively by the dotted rectangles 117 and 119 in FIG. 11.

The front plastic fastener part 116 has a sheet portion 124 which reinforces the panel 96, and has an undercut pin 113 with undercut 13 which is received in a socket 126 of the back fastener part 118 as shown in FIGS. 13, 14 and 16. The fastener part 118 has a sheet portion 128 which reinforces the panels 94 and 112 of the cardboard blank 114, and a spacing land portion 129 on which the CD record 91 rests.

The end panel 112 has an access opening 130 which accommodates the socket 126, FIG. 14, and also provides clearance for the pin 113, which latter projects downward through an opening 132 in the panel 96. Note that the fastener part 116 is positioned face-down on the panel 96, so that the pin 113 projects from the back of the panel as viewed in FIG. 11.

In FIG. 15 the end panels 110 and 112 have been folded inward over the respective fastener parts and glued. The completed booklet shown in FIG. 15 now has the laminated back cover and laminated front cover all hingedly connected along fold line 134 and hinge 90 shown in FIGS. 14 and 15. The CD record is placed on the hub 138 of the back fastener part 118, see FIG. 16, and the laminate which is seen as 110 in FIG. 15 is folded inward over the laminate that is seen as 100. These two laminates are then folded over the laminate which is seen as 112, thereby closing the booklet with the CD record 91 protected inside.

Another embodiment of the invention is illustrated in FIGS. 17–20. This embodiment of the invention differs from the previously described embodiments in that whereas the booklet of FIGS. 1–8 is adapted to hold only one CD record, the booklet of FIGS. 17–20 is adapted to hold two CD records instead of only one. Basically the additional capacity involves the provision of a hub on the existing front fastener part whereby it has a double function, thereby to enable it to carry the additional CD record while also serving as a fastener.

With this explanation in mind, FIGS. 17–20 have been given similar characters wherever possible, with the added suffixes of the letters "a" or "b". Accordingly, the corresponding parts as shown are 38a for the front end panel, 23b for the front fastener pins, 66a for the front fastener tongue, 36a for the clearance space around the edge of the tongue 66a, and 42a for a clearance space around the pins 23b.

In this embodiment the space 42a is circular and much larger than the space 42 seen in FIG. 3, and is occupied by a spacer land area 88a and a hub 86a, both encircling the pins 23b and being integral with the tongue 66a of the plastic fastener and hinge portion of the booklet.

The additional CD record can now be accommodated on the hub 86a of the booklet, so as to face the CD record 91, FIG. 16. FIG. 20 clearly shows these portions which now make up the plastic fastener.

Yet another embodiment of the invention is illustrated in FIGS. 21–25, which is based on the embodiment of FIGS. 11–16 that relates to a booklet having a panel arrangement which provides the pocket 120 (FIGS. 14, 15) for accommodating descriptive literature. In this latest new embodiment, provision is made for carrying an additional CD record 142 (FIG. 25), in addition to a record 91b corresponding to the record 89 shown as being carried by the hub 86 in FIG. 8.

Basically again the additional capacity involves the provision of a hub on a front fastener part whereby it has a double function so as to enable it to carry the additional CD record while at the same time serving as a fastener. In FIG. 25 the two CD records have been given the numbers 91b and 142.

With this in mind, FIGS. 21–25 have been given similar characters wherever possible, with the added suffixes of the letters "b" or "c". The corresponding parts are 113b for the front fastener pin, 110b for the front end panel, 98b and 104b for side panels of the part 96b which latter has a clearance hole 132b for the pin 113b and is hingedly connected to the end panel 110b. Also to be included is the number 124b of a sheet portion of a front fastener part 116b. The panel 110b has a clearance hole 130b to receive a portion of a unique configuration of CD record mounting and fastener part, comprising a hub 86b and land area 88b which are back-to-back with respect to the fastener pin 113b.

The stack-up of components is shown in fragmentary section in FIG. 25, with their given numbers. The section designated 128b is in the same plane as side panels which correspond to the panels 102 and 108 shown in FIG. 14, and the section designated 124b is in the same plane as side panels which correspond to the panels 98 and 104 in this figure.

The front fastener part 116b as seen in FIG. 22 is reversed or placed topside down when put on the panel 96b so that the fastener pin 113b projects through the hole 132b and the hub 86b faces upward on the panel 96b, FIG. 25.

Still another embodiment of the invention is illustrated in FIGS. 26–28. This embodiment involves separate, unique simpler fastener parts for the front and back covers of the CD booklet, characterized by circular, disk-like bases which uniformly reinforce the covers at their central portions, in conjunction with ring-shaped telescoping portions and reduced-area lands which also constitute a mounting means for the record. This later embodiment otherwise involves a construction similar to the embodiment of the invention shown in FIGS. 1–8, and accordingly reference characters have been used in the following explanation which are similar to those that describe previous structures except that "d" suffixes have been added.

In the figures, 66d and 64d designate circular, disk-like base portions of separate resilient plastic fastener parts having respectively a fastener ring 23d and a fastener ring 83d which latter Telescopically receives the ring 23d with a snap action fit. The ring 83d snugly fits into the center hole of the CD record 91d with a friction fit.

Folded-in end panels of the covers are designated 38d and 56d. In FIG. 28, the front cover panel is 26d and the rear cover panel is 44d. The fastener bases 64d and 66d lie in the same plane as the side panels 46d and 28d of the cardboard blank, being covered by the end panels 56d and 38d.

The fastener rings 23d and 83d have slight undercuts which are not possible to depict in the drawings, being on the order of 0.005". The undercut on the ring 23d is on its outside circumference and the undercut on the ring 83d is on its inside circumference. Since the rings are of thin section and of resilient plastic, a distinct, advantageous snap connection can be had.

From the above it can be seen that I have provided novel and improved folders or booklets for compact disk records, which are especially durable yet extremely simple in their structure, and particularly economical to manufacture and assemble. The disclosed devices lend themselves to assembly by automated equipment, thereby keeping the overall cost as low as possible.

Both the cardboard and plastic components are readily capable of production with equipment that is currently available, such that mass production of the booklets is easily achievable.

The disclosed devices are thus seen to represent a distinct advance and improvement in the field of compact disk packaging.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

LISTING OF REFERENCE CHARACTERS

10. Booklet or folder
12. Front cover
13. Undercut
14. Back cover
16. Hinge means
18. Cardboard hinge portion
20. Plastic hinge portion
21. Cardboard blank
22. Hinge and fastener member or support strip
22a. Modified plastic strip
23. Projecting pins
23a. Hollow projecting pin
23b. Front fastener pins
23d. Fastener pin
24. Socket formation
26. Face cover panel
26d. Face cover panel
27. Fold line
28. Side panel
28d. Side panel
30. Side panel
32. Fold line
34. Fold line
36. T-shaped recess or pocket
36a. Clearance space
38d. Front end panel
38. End panel
38a. Front end panel
38d. Front end panel
40. Fold line
42. Clearance hole
42a. Clearance space
44. Back face cover panel
44d. Back face cover panel
45. Fold line
46. Side panel
46d. Side panel
48. Side panel
50. Fold line
52. Fold line
54. T-shaped recess
56. End panel
56d. End panel
58. Fold line
60. Clearance hole
64. Tongue
64a. Tongue
64d. Base
66. Tongue
66a. Tongue
66d. Base
70. Hinge or groove
72. Hinge or groove
76. Through opening
78. Through opening
80. Land portions
82. Land portions
83. Center post 84. Land portions
85. Slits, eight
86. Hub
86b. Hub
87. Through opening
88. Plateau of land
88a. Spacer lane area
88b. Land area
88d. Land
89. Disk or record
90. Double line fold
91. Disk or record
91b. CD record
91d. CD record
92. Front cover face panel
94. Back cover face panel
95. Clearance space
96. Front fastener part carrier panel
96b. Panel
98. Side panel for locating front fastener part
98b. Side panel
100. Side panel to stiffen front cover
102. Side panel for locating back fastener part
104. Side panel for locating front fastener part
104b. Side panel
106. Pocket flap side panel
108. Side panel for locating back fastener part
110. End panel for locking front fastener part
110b. Front end panel
112. End reinforcing panel for locking back fastener part
113. Undercut pin
113b. Front fastener pin
114. Cardboard blank
116. Front fastener part
116b. Front fastener part
117. Dotted rectangle
118. Back fastener part
119. Dotted rectangle
120. Pocket
122. Glue line
124. Sheet portion of front fastener part
124b. Sheet portion
126. Socket
128. Sheet portion of back fastener part
128b. Section of fastener part
129. Spacing land portion
130. Access opening
130b. Clearance hole
132. Opening in panel 96
132b. Clearance hole 134. Fold line
138. Hub
142. CD record

What is claimed is:

1. A booklet for enclosing a compact disk record having a center hole, comprising in combination:
    a) a pair of stiff front and back covers having edges, and hinge means connecting said covers to each other for relative opening and closing movement, and
    b) a two-part separable fastener, the parts of which are respectively carried at the interior surfaces of said covers and at locations spaced inwardly of the edges thereof,
    c) said two-part fastener passing through the center hole of the compact disk record and the parts of said fasteners frictionally engaging each other at a plurality of spaced-apart peripheral locations so as to releasably hold said parts together and hold the record captive between the front and back covers when the covers are closed,
    d) said covers comprising laminations of cardboard,
    e) said fastener parts having means which reinforce the covers,
    f) said reinforcement means being disposed between the laminations of the covers.

2. A booklet for enclosing a compact disk record having a center hole, comprising in combination:
    a) a pair of stiff front and back covers having edges, and hinge means connecting said covers to each other for relative opening and closing movement, and
    b) a two-part separable fastener, the parts of which are respectively carried at the interior surfaces of said covers and at locations spaced inwardly of the edges thereof,
    c) said two-part fastener passing through the center hole of the compact disk record and the parts of said fasteners frictionally engaging each other at a plurality of spaced-apart peripheral locations so as to releasably hold said parts together and hold the record captive between the front and back covers when the covers are closed,
    d) said covers comprising laminations of cardboard,
    e) said fastener parts having means which reinforce the covers,
    f) the reinforcing means of the fastener parts comprising sheet portions thereof which are disposed between the laminations of the covers.

3. A booklet for enclosing a compact disk record having a center hole, comprising in combination:
    a) a pair of stiff front and back covers having edges, and hinge means connecting said covers to each other for relative opening and closing movement, and
    b) a two-part separable fastener, the parts of which are respectively carried at the interior surfaces of said covers and at locations spaced inwardly of the edges thereof,
    c) said two-part fastener passing through the center hole of the compact disk record and the parts of said fasteners frictionally engaging each other at a plurality of spaced-apart peripheral locations so as to releasably hold said parts together and hold the record captive between the front and back covers when the covers are closed,
    d) said covers comprising laminations of cardboard,
    e) said fastener parts having means which reinforce the covers,
    f) said laminations forming flat recesses,
    g) said reinforcing means of the fastener parts comprising sheet portions thereof which are held captive in said flat recesses.

4. A booklet for enclosing a compact disk record, comprising in combination:
    a) a pair of stiff front and back covers, and hinge means connecting said covers to each other for relative opening and closing movement,
    b) a two-part separable fastener, the parts of which are respectively carried at the interior surfaces of said covers and at locations spaced inwardly of the edges thereof,
    c) said two-part fastener being adapted to pass through the center hole of the compact disk record and to releasably hold the record captive between the covers when the latter are closed,
    d) the front cover including a front panel, a fastener part carrier panel, and a fastener part locking panel.

5. A booklet for enclosing a compact disk record, comprising in combination:
   a) a pair of stiff front and back covers, and hinge means connecting said covers to each other for relative opening and closing movement,
   b) a two-part separable fastener, the parts of which are respectively carried at the interior surfaces of said covers and at locations spaced inwardly of the edges thereof,
   c) said two-part fastener being adapted to pass through the center hole of the compact disk record and to releasably hold the record captive between the covers when the latter are closed,
   d) the front cover including a fastener part carrier panel hingedly connected to said front panel.

6. A booklet for enclosing a compact disk record, comprising in combination:
   a) a pair of stiff front and back covers, and hinge means connecting said covers to each other for relative opening and closing movement,
   b) a two-part separable fastener, the parts of which are respectively carried at the interior surfaces of said covers and at locations spaced inwardly of the edges thereof,
   c) said two-part fastener being adapted to pass through the center hole of the compact disk record and to releasably hold the record captive between the covers when the latter are closed,
   d) the front cover having means providing a pocket in the booklet.

7. A booklet for enclosing a compact disk record, comprising in combination:
   a) a pair of stiff front and back covers, and hinge means connecting said covers to each other for relative opening and closing movement,
   b) a two-part separable fastener, the parts of which are respectively carried at the interior surfaces of said covers and at locations spaced inwardly of the edges thereof,
   c) said two-part fastener being adapted to pass through the center hole of the compact disk record and to releasably hold the record captive between the covers when the latter are closed, and
   d) means on the back cover for carrying said compact disk record.

8. A booklet for enclosing a compact disk record, comprising in combination:
   a) a pair of stiff front and back covers, and hinge means connecting said covers to each other for relative opening and closing movement,
   b) a two-part separable fastener, the parts of which are respectively carried at the interior surfaces of said covers and at locations spaced inwardly of the edges thereof,
   c) said two-part fastener being adapted to pass through the center hole of the compact disk record and to releasably hold the record captive between the covers when the latter are closed,
   d) the parts of the fastener comprise circular rings which can telescopically engage each other in the fastening mode.

9. A booklet for enclosing a compact disk record, comprising in combination:
   a) a pair of stiff front and back covers, and hinge means connecting said covers to each other for relative opening and closing movement,
   b) a two-part separable fastener, the parts of which are respectively carried at the interior surfaces of said covers and at locations spaced inwardly of the edges thereof,
   c) said two-part fastener being adapted to pass through the center hole of the compact disk record and to releasably hold the record captive between the covers when the latter are closed,
   d) the parts of the fastener comprising a circular ring, and a cooperable protrusion which can telescopically fit into the ring in the fastening mode, with a snap fit.

10. A protective folder for a compact disk record, comprising in combination:
    a) a back cover member having an expansive surface adapted to underlie the compact disk record,
    b) a front cover member and means hingedly connecting said front cover member to said back cover member, said front cover member having an expansive surface adapted to overlie the compact disk record when the latter is disposed in overlying relation to said back cover member,
    c) means on one of said members, providing a hub which extends into the center hole in the compact disk record when the latter is disposed between the members, and
    d) cooperable snap fastener means on said members and having a fastener portion disposed at the location of said hub, for releasably maintaining the members in overlying relation with one another and with the compact disk record sandwiched therebetween,
    e) said hinged connecting means comprising a living hinge member having oppositely-extending tongues, one tongue being connected with said back cover member and the other tongue being connected with the front cover member, whereby the back cover member and front cover member can flex with respect to each other about the axis of the living hinge.

11. A protective folder as set forth in claim 10, wherein:
    a) said back cover member and said front cover member have essentially equal widths, and
    b) the length of the living hinge being substantially the same as the widths of the back cover member and front cover member.

12. A protective folder as set forth in claim 10, wherein:
    a) the back cover member has a pocket in which one tongue of the hinge member is inserted.

13. A protective folder as set forth in claim 10, wherein:
    a) the front cover member has a recess in which one tongue of the hinge member is inserted.

14. A protective folder as set forth in claim 10, wherein:
    a) the back cover member has a recess in which one tongue of the hinge member is inserted, said recess of the back cover member being formed by folding a side panel thereof toward its expansive surface, so as to form a double thickness of material.

15. A protective folder as set forth in claim 12, wherein:
    a) the back cover member has a side panel, and the pocket of the back cover member is formed by folding a side panel thereof toward its expansive surface, so as to form a double thickness of material.

16. A protective folder as set forth in claim 12, wherein:
    a) the back cover member has a pair of side panels, and the pocket of the back cover member is formed by folding said two side panels toward each other and toward the expansive surface of the back cover member.

17. A protective folder as set forth in claim 10, wherein:
a) the front cover member has a pair of side panels, and the recess of the front cover member is formed by folding said side panels toward each other and toward the expansive surface of the front cover member.

18. A protective folder as set forth in claim 10, wherein:
a) the hinge member is constituted of plastic substance.

19. A protective folder as set forth in claim 10, wherein:
a) the hinge member comprises two hinges that are coextensive with one another, spaced apart, and which extend substantially the entire width of the hinge member.

20. A protective folder as set forth in claim 10, wherein:
a) the back cover member is constituted of cardboard, said back cover member being substantially rectangular in configuration and having four edge portions, one of which is adjacent said living hinge, and the other three of which are formed by folded portions of said back cover member, so as to impart a smooth edge configuration to said other three edge portions.

21. A protective folder as set forth in claim 10, wherein:
a) the front cover member is constituted of cardboard, said front cover member being substantially rectangular in configuration and having four edge portions, one of which is adjacent said living hinge, and the other three of which are formed by folded portions of said front cover member, so as to impart a smooth edge configuration to said other three edge portions.

22. A protective folder as set forth in claim 10, wherein:
a) one tongue of the living hinge member is slidably received in the back cover member.

23. A protective folder as set forth in claim 10, wherein:
a) one tongue of the living hinge member is slidably received in the front cover member.

24. A protective folder as set forth in claim 10, wherein:
a) said fastener means comprises a socket formation which is disposed within said hub for the compact disk record.

25. A protective folder as set forth in claim 24, wherein:
a) said fastener means comprises a projecting pin which is disposed on the other one of said front and back cover members, said projecting pin being receivable in the socket formation when the front cover member is folded over the back cover member.

26. A protective folder as set forth in claim 10, wherein:
a) said fastener means comprises separable, telescoping fasteners, one of which has an undercut, to provide a snap retention of the front cover member on the back cover member when the front cover member is folded over the back cover member.

27. A protective folder as set forth in claim 10, wherein:
a) said fastener means comprises a socket having the configuration of the capital letter "B".

28. A protective folder as set forth in claim 10, wherein:
a) said tongues are substantially T-shaped in configuration.

29. A protective folder as set forth in claim 10, wherein:
a) said tongues are characterized by differing widths respectively, to facilitate positioning thereof with respect to one another as during automated handling of the hinge member.

30. A protective cover for a compact disk record, comprising in combination:
a) a support strip having a transverse groove constituting a hinge, to enable a portion of the strip on one side of the hinge to be shifted from an extended position wherein the opposite ends of the strip are remote from one another, to a collapsed position wherein portions of the strip adjacent the hinge are juxtaposed to one another,
b) means providing a mounting hub for a compact disk record, disposed on one of said strip portions, the spacing from said mounting hub and said hinge being equal to or greater than the radius of the compact disk record,
c) a two-part separable snap fastener on said strip, one of said parts being disposed at the mounting hub of said one strip portion, and the other of said parts being disposed on the other of said strip portions, such that in said collapsed position, the parts align and can be snapped together, to thereby retain the compact disk record captive in the manner of a yoke.

31. The invention as set forth in claim 30, and further including:
a) a substantially flat, expansive cover member carried by one of said portions of said strip, so as to be closely adjacent to one side of said compact disk record when the strip is disposed in its collapsed position.

32. A booklet for holding a compact disk record, comprising in combination:
a) a support strip having a transverse groove constituting a hinge, to enable a portion of the strip on one side of the hinge to be shifted from an extended position wherein the opposite ends of the strip are remote from one another, to a collapsed position wherein other portions of the strip that are adjacent to the hinge are juxtaposed to one another,
b) a pair of expansive sheets respectively carried by the strip, one sheet being disposed on one side of the hinge and the other sheet being disposed on the other side of the hinge, said sheets also being connected by a hinge, and
c) means on one of said sheets, defining a recess therein in which one portion of said strip is slidably received,
d) the hinge of said support strip overlying the hinge of said sheets, whereby as the said one portion of the strip is shifted from its extended position toward its collapsed position, it can slide in said recess so as to compensate for the greater folded length of the hinge of the sheets as compared with the folded length of the hinge of the strip.

33. A booklet for enclosing a compact disk record as set forth in claim 5, and further including:
a) a fastener part locking panel hingedly connected to said fastener part carrier panel.

34. A booklet for enclosing a compact disk record as set forth in claim 4, wherein:
a) said front cover, fastener part carrier panel and fastener part locking panel are hingedly connected with each other.

35. A booklet for enclosing a compact disk record as set forth in claim 4, wherein:
a) the back cover includes a fastener part locking panel, all panels being hingedly connected to each other.

36. A booklet for enclosing a compact disk record as set forth in claim 4, wherein:
a) said cover and all said panels are constituted of cardboard.

37. A booklet for enclosing a compact disk record as set forth in claim 7, wherein:

a) said record carrying means comprises a hub integrally joined to the fastener part which is located at the interior surface of the back cover.

38. A booklet for enclosing a compact disk record as set forth in claim 7, wherein:

a) means are provided respectively on each of the front and back covers, each for carrying a separate compact disk record.

39. A booklet for enclosing a compact disk record as set forth in claim 38, wherein:

a) the means on the inside of the front cover for carrying a compact disk record comprises a hub which is receivable in the center opening of the record and which is integrally joined to the fastener part that is located at the inside of the front cover.

40. A booklet for enclosing a compact disk record as set forth in claim 39, wherein:

a) the means on the inside of the back cover for carrying a compact disk record comprises a hub which is receivable in the center opening of the record and which is integrally joined to the fastener part that is located at the inside of the back cover.

41. A booklet for enclosing a compact disk record as set forth in claim 6, wherein:

a) means are provided on the inside of the back cover for carrying a compact disk record.

42. A booklet for enclosing a compact disk record as set forth in claim 41 wherein:

a) said carrying means comprises a hub which is receivable in the center opening of the record and which is integrally joined to the fastener part that is located at the inside of the back cover.

43. A booklet for enclosing a compact disk record as set forth in claim 8, wherein:

a) the fastener parts have circular bases which carry the said circular rings.

* * * * *